United States Patent
Roach et al.

(10) Patent No.: US 6,304,910 B1
(45) Date of Patent: *Oct. 16, 2001

(54) COMMUNICATION PROCESSOR HAVING BUFFER LIST MODIFIER CONTROL BITS

(75) Inventors: Bradley Roach, Newport Beach; Peter Fiacco; Greg Scherer, both of Yorba Linda; Stuart Berman, Newport Beach; David Duckman, Long Beach, all of CA (US)

(73) Assignee: Emulex Corporation, Costa Mesa, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/937,065

(22) Filed: Sep. 24, 1997

(51) Int. Cl.⁷ .................................................. G06F 13/00

(52) U.S. Cl. ................................... 709/236; 370/276

(58) Field of Search .................... 359/152, 154, 359/118, 135, 136; 709/236, 300, 302, 212, 251, 225, 249, 230, 245; 370/470, 471, 472, 473, 474, 475, 476, 401, 235, 453, 276; 395/400, 325; 700/7; 710/52, 5, 38, 53

(56) References Cited

U.S. PATENT DOCUMENTS

| | | | |
|---|---|---|---|
| 4,346,440 | * 8/1982 | Kyu et al. | 709/236 |
| 4,829,475 | 5/1989 | Ward et al. | 365/78 |
| 4,975,829 | * 12/1990 | Clarey et al. | 395/500 |
| 5,070,477 | * 12/1991 | Latif et al. | 395/325 |
| 5,224,093 | 6/1993 | Denzel et al. | 370/417 |
| 5,305,253 | 4/1994 | Ward | 365/73 |
| 5,361,340 | * 11/1994 | Kelley et al. | 395/400 |
| 5,426,639 | 6/1995 | Follett et al. | 370/412 |
| 5,444,853 | 8/1995 | Lentz | 711/123 |
| 5,546,347 | 8/1996 | Ko et al. | 365/221 |
| 5,638,518 | * 6/1997 | Malladi | 709/251 |
| 5,727,218 | * 3/1998 | Hotchkin | 710/260 |
| 5,742,765 | * 4/1998 | Wong et al. | 709/212 |
| 5,748,905 | * 5/1998 | Hauser et al. | 709/249 |
| 5,809,328 | * 9/1998 | Nogales et al. | 710/5 |
| 5,828,901 | * 10/1998 | O'Toole et al. | 710/22 |
| 5,845,085 | * 12/1998 | Gulick | 709/236 |
| 5,922,046 | * 7/1999 | Thomas et al. | 709/212 |
| 5,963,444 | * 10/1999 | Shidara et al. | 700/7 |
| 5,978,378 | * 11/1999 | Van Seters et al. | 370/401 |
| 6,005,849 | * 12/1999 | Roach et al. | 370/276 |
| 6,041,058 | * 3/2000 | Flanders et al. | 370/401 |
| 6,098,125 | * 8/2000 | Fiacco et al. | 710/52 |

OTHER PUBLICATIONS

Anzaloni et al. FCS/ATM interworking: A design Solution. IEEE, Dec. 1993.*

Lee et al. Ultra High Speed networking solution: FCA and its implementation IEEE, Aug. 1995.*

Sachs et al. Fibre Channel and Related Standards. IEEE, Aug. 1996.*

(List continued on next page.)

*Primary Examiner*—Mehmet B. Geckil
*Assistant Examiner*—Thong Vu
(74) *Attorney, Agent, or Firm*—Fish & Richardson PC (57) ABSTRACT

A communication processor sends and receives frames of data and commands. Transmit and receive protocol engine is controlled by host driver software which utilizes predetermined bits to indicate which frame is the last frame in a series of frames. This information is then placed in the transmit frame before it is sent.

15 Claims, 10 Drawing Sheets

OTHER PUBLICATIONS

Snively. Implementing Fibre Channel SCSI Transport. IEEE, Mar. 1994.*

Cummings. System Architectures Using Fibre Channel. IEEE, Apr. 1993.*

Tolmie et al. HIPPI Simplicity Yields Success. IEEE, Jan. 1993.*

IBM: DMA Controller Channel interlocking, Jan. 1994.*

Snively, "Implementing a Fibre Channel SCSI transport," IEEE, Mar. 1994.*

Sachs et al., "Fibre Channel and related standards," IEEE, Aug. 1996.*

Lee et al, "Ultra high–speed networking solution: Fibre Channel Architecture and its implementation," IEEE, Aug. 1995.*

Tolmie et al., "HIPPI: simplicitly yields success," IEEE, Jan. 1993.*

Cummings, R., "System architectures using Fibre Channel," IEEE, Apr. 1993.*

Anzaloni et al., "Fibre channel (FCS)/ATM internetworking: a design solution," IEEE, Dec. 1993.*

Seagate Fibre Channel Interface Product Manual, Publication No. 77767496 Rev A, Seagate Technology, Inc., Mar. 1997.*

* cited by examiner

FIG. 1
*(PriorArt)*

FIBRE CHANNEL FRAME

| | 31 | 24 23 | 16 15 | 8 7 | 2 1 0 |
|---|---|---|---|---|---|
| Word 0 | | | Reserved | | 0 0 |

| | 31 | 24 23 | 16 15 | 8 7 | 0 |
|---|---|---|---|---|---|
| Word 1 | | | TTSZ | | |

*Load Total Transfer Size into FireLiteXRI CTX*

| | 31 | 24 23 | 16 15 | 8 7 | 2 1 0 |
|---|---|---|---|---|---|
| Word 0 | | | BSWA | | 0 0 |

| | 31 | 24 23 | 18 17 16 15 | 8 7 | 2 1 0 |
|---|---|---|---|---|---|
| Word 1 | BLM | Reserved BLM | | BWC | 0 0 |

*Describe Buffer Starting Word Address and Buffer Word Count*

| | 31 | 24 23 | 16 15 | 8 7 | 0 |
|---|---|---|---|---|---|
| Word 0 | | | IO TAG | | |

| | 31 | 24 23 | 18 17 16 15 | 8 7 | 2 1 0 |
|---|---|---|---|---|---|
| Word 1 | BLM | Reserved BLM | | BWC=0 | 0 0 |

*Terminate the Buffer list*

COMMUNICATION PROCESSOR HAVING BUFFER LIST MODIFIER CONTROL BITS

BACKGROUND OF THE INVENTION

1. Field of the Invention

This invention relates to devices for transferring data in computer networks, and more particularly to a device utilizing control bits to facilitate generating and transmitting frames of data across a computer network boundary.

2. Description of Related Art

The number of computers and peripherals has mushroomed in recent years. This has created a need for improved methods of interconnecting these devices. A wide variety of networking paradigms have been developed to enable different kinds of computers and peripheral components to communicate with each other.

There exists a bottleneck in the speed with which data can be exchanged along such networks. This is not surprising because increases in network architecture speeds have not kept pace with faster computer processing speeds. The processing power of computer chips has historically doubled about every 18 months, creating increasingly powerful machines and bandwidth hungry applications. It has been estimated that one megabit per second of input/output is generally required per "MIPS" (millions of instructions per second) of processing power. With CPUs now easily exceeding 200 MIPs, it is difficult for network architecture to keep up with these faster speeds.

Area-wide networks (e.g., LANs and WANs) and channels are two approaches that have been developed for computer network architectures. Traditional networks offer a great deal of flexibility and relatively long distance capabilities. Channels, such as Enterprise System Connection (ESCON) and Small Computer System Interface (SCSI), have been developed for high performance and high reliability. Channels typically use dedicated short-distance connections between computers or between computers and peripherals.

Features of both channels and networks have been incorporated into a new network standard known as "Fibre Channel". Fibre Channel systems combine the speed and reliability of channels with the flexibility and connectivity of networks. Fibre Channel products currently can run at very high data rates, such as 266 or 1062 Mbps. These speeds are sufficient to handle quite demanding applications such as uncompressed, full motion, high-quality video.

There are generally three ways to deploy Fibre Channel: simple point-to-point connections; arbitrated loops; and switched fabrics. The simplest topology is the point-to-point configuration, which simply connects any two Fibre Channel systems directly. Arbitrated loops are Fibre Channel ring connections that provide shared access to bandwidth via arbitration. Switched Fibre Channel networks, called "fabrics", yield the highest performance by leveraging the benefits of cross-point switching.

The Fibre Channel fabric works something like a traditional phone system. The fabric can connect varied devices such as work stations, PCs, servers, routers, main frames, and storage devices that have Fibre Channel interface ports. Each such device can have an origination port that "calls" the fabric by entering the address of a destination port in a frame header. The Fibre Channel specification defines the structure of this frame. (This frame structure raises data transfer issues that will be discussed below and addressed by the present invention). The Fibre Channel fabric does all the work of setting up the desired connection, hence the frame originator does not need to be concerned with complex routing algorithms. There are no complicated permanent virtual circuits (PVCs) to set up. Fibre Channel fabrics can handle more than 16 million addresses, and so are capable of accommodating very large networks. The fabric can be enlarged by simply adding ports. The aggregate data rate of a fully configured Fibre Channel network can be in the tera-bit-per-second range.

Figure 1:
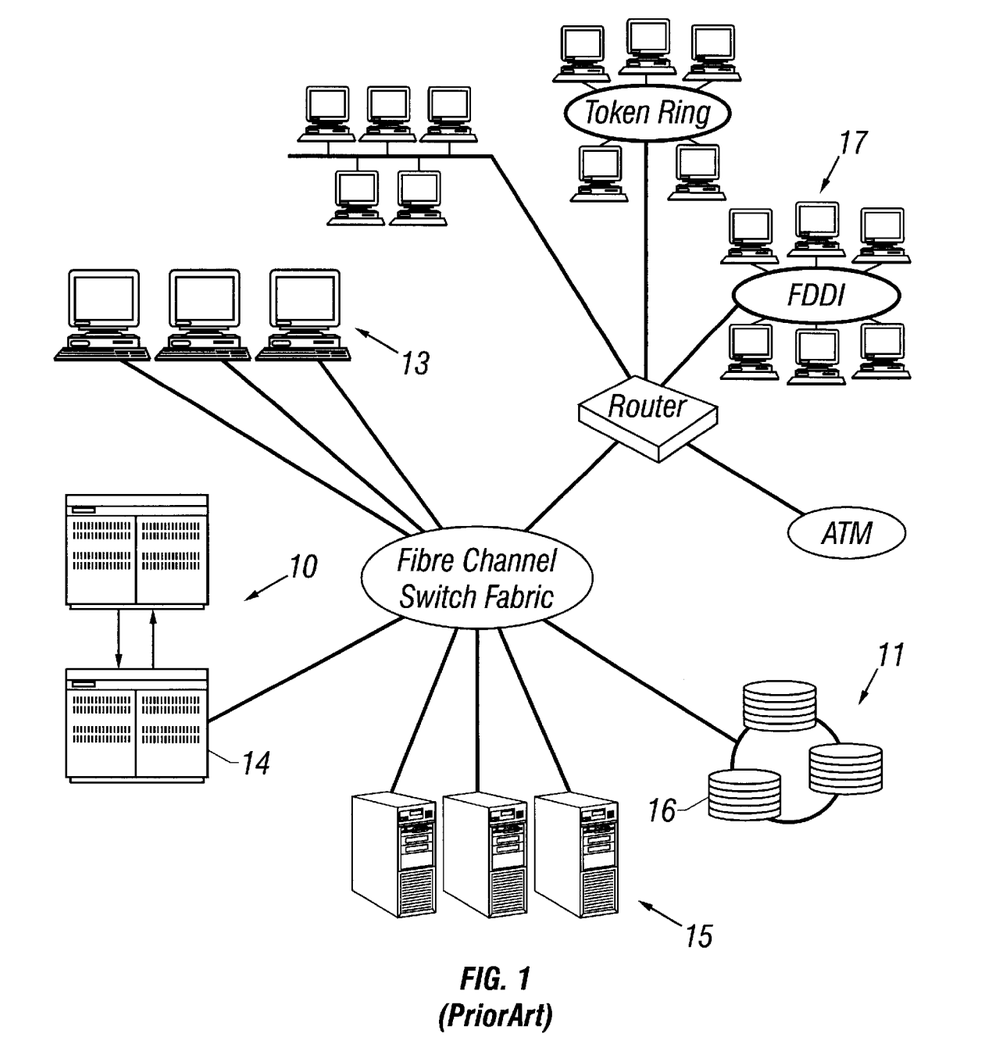
FIG. 1 is a block diagram of a prior art complex computer network utilizing Fibre Channel technology.

Each of the three basic types of Fibre Channel connections are shown in FIG. 1, which shows a number of ways of using Fibre Channel technology. In particular, point-to-point connections 10 are shown connecting mainframes to each other. A Fibre Channel arbitrated loop 11 is shown connecting disk storage units. A Fibre Channel switch fabric 12 connects work stations 13, mainframes 14, servers 15, disk drives 16 and local area networks (LANS) 17. The LANS include, for example, Ethernet, Token Ring and FDDI networks.

Figure 2:
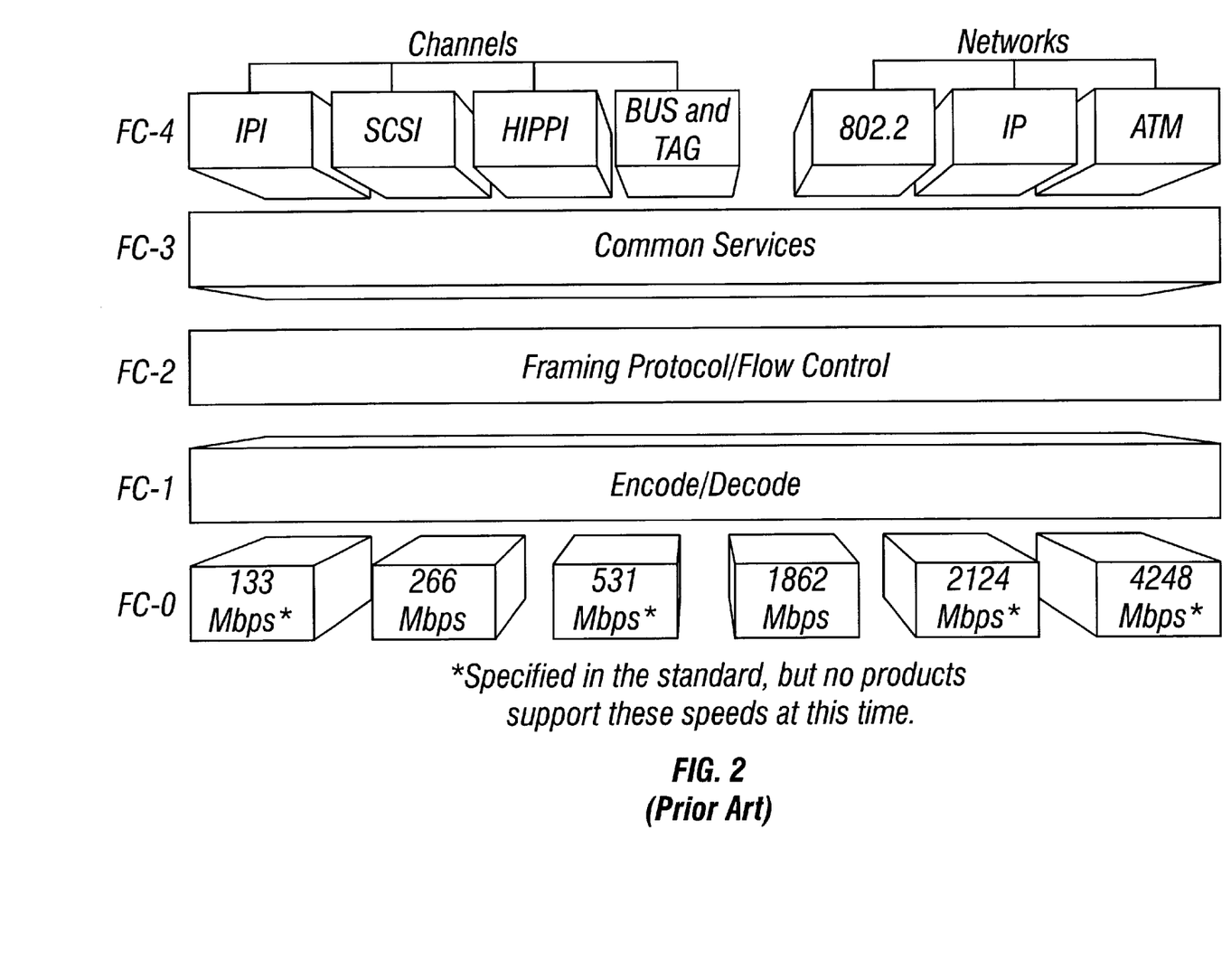
FIG. 2 is a diagram of the five functional layers of the prior art Fibre Channel standard.

An ANSI specification (X3.230-1994) defines the Fibre Channel network. The specification distributes Fibre Channel functions among five layers. As shown in FIG. 2, the five functional layers of the Fibre Channel are: FC-0-the physical media layer; FC-1-the coding and decoding layer; FC-2-the actual transport mechanism, including the framing protocol and flow control between nodes; FC-3- the common services layer; and FC-4-the upper layer protocol.

While the Fibre Channel operates at relatively high speed, it would be desirable to increase speeds further to meet the needs of faster processors. One way to do this would be to eliminate, or reduce, delays that occur at interface points. One such delay occurs during the transfer of a frame from the FC-1 layer to the FC-2 layer. At this interface, devices linked by a Fibre Channel data link receive Fibre Channel frames serially. A protocol engine receives these frames and processes them at the next layer, the FC-2 layer shown in FIG. 2. The functions of the protocol engine includes validating each frame; queuing up DMA operations to transfer each frame to the host; and building transmit frames.

The high bit speeds of the Fibre Channel data link places extreme demands on the protocol engine. Hence, some protocol engines can only operate in half-duplex mode, which means that the protocol engine can process data in only one direction at a time. This significantly slows down speed of the data transfer since either the transmit or the receive task must wait while the other task is performed.

Full-duplex protocol engines can process both received and transmitted frames simultaneously. Hence full-duplex protocol engines significantly improve data throughput. However, in full-duplex protocol engines, usually a microprocessor with local RAM handles the transmit and receive operations. The use of a microprocessor for this function greatly increases the cost of the protocol engine.

Conventional protocol engines also sometimes rely on the involvement of a host CPU on a frame-by-frame basis. For example, validation of received frames and generation of acknowledgments to received frames typically involve the host CPU. Involving the host CPU limits frame transmission and reception rates and prevents the host CPU from performing other tasks.

Moreover, a transmit protocol engine must have advance notice of the frame payload data size in order to build a transmit frame "header". One way to accomplish this is for the transmit protocol engine to access computer memory where a series of frames have been stored and modify the header field in the last frame. However, if the transmit protocol engine cannot determine whether or not the current frame is the final frame before transferring payload data, this extra step slows the process of building and transmitting the frame header, and hence slows the overall communication data rate.

In view of the foregoing, objects of the invention include: increasing data transfer processing speeds in high speed networks such as the Fibre Channel network; providing a technique that can speed up a protocol engine's processing of data frames; providing a protocol engine that can perform high speed full duplex processing of data without involving the host CPU on a frame-by-frame basis; and providing a way for a transmit protocol engine to predetermine whether or not the current frame is the final frame, as well as having advance notice of the frame payload data size.

SUMMARY OF THE INVENTION

The invention is directed to the processing and transferring of frames of data in a computer data link. The invention is a full-duplex communication processor that uses dual micro-coded engines and specialized hardware to build transmit frames and to validate receive frames without involving a host CPU on a frame-by-frame basis and without a resident microprocessor. A preferred embodiment of the invention uses independent transmit and receive protocol processors. These independent processors communicate with each other using a transfer queue. A context manager provides context information that is used by the receive processor to validate received frames and by the transmit processor to build transmit frames.

The context information points to a buffer bit which gives the address and size of buffer segments and control bits (Buffer List Modifier Bits) for each segment. The transmit protocol processor uses these control bits to determine how the data in the buffer segments can be transmitted in a sequence of frames. This information increases the speed with which the transmit protocol processor can build and transmit the transmit frame header. In a preferred embodiment, the data channel is a Fibre Channel data link and the full-duplex communication processor is configured to process FC-2 protocol Fibre Channel frames.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

The invention is a full-duplex communication processor that improves frame transmission and frame reception rates in high speed data links such as the Fibre Channel. By using independent transmit and receive microcoded engines communicating directly to host driver software, full-duplex inter-processor communication is accomplished without involving the host CPU. The use of Buffer List Modifier Control Bits speeds the building and transmitting of transmit frames by giving the transmit processor advance notice of which frame buffer contains the last frame.

Figure 3:
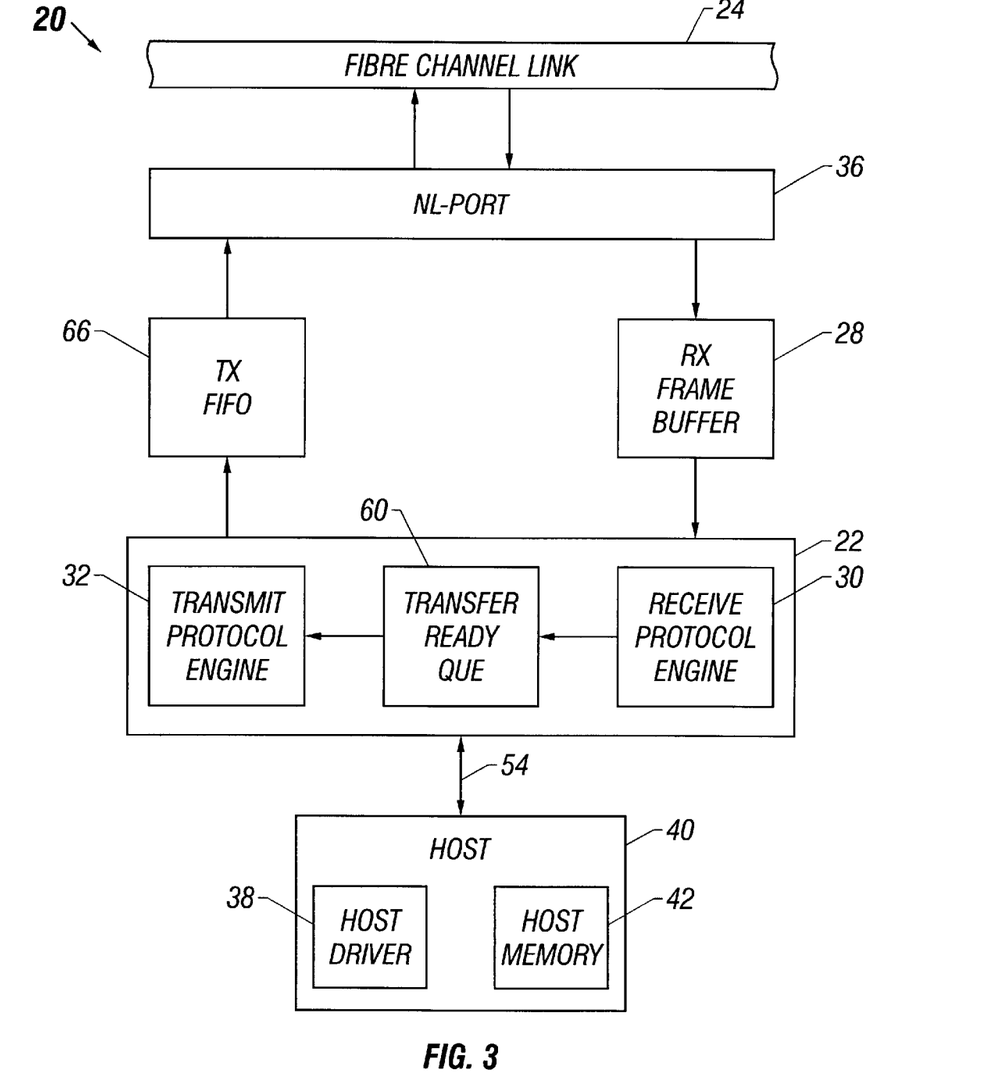
FIG. 3 is a simplified block diagram of a communication processing system in accordance with a preferred embodiment of the invention.
Figure 4:
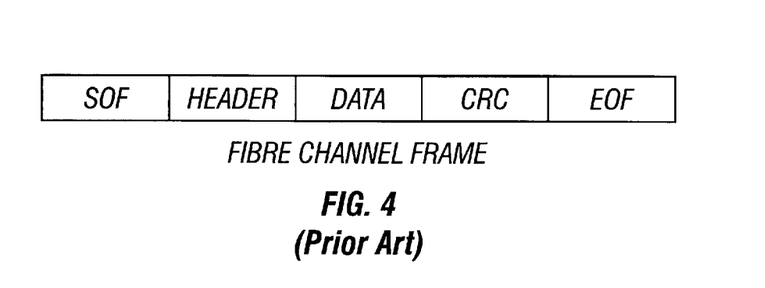
FIG. 4 is a diagram of a typical prior art Fibre Channel frame of data.

FIG. 3 shows a Fibre Channel communication system 20 utilizing the full-duplex communication processor 22 in accordance with a preferred embodiment of the invention. Serial data is received along a Fibre Channel data link 24. Frames generally will comprise three portions, a preamble, a data or "payload" portion, and a trailer portion. In a Fibre Channel data link, for example, the Fibre Channel frame consists of a start of frame (SOF) word (four bytes); a data portion comprising a frame header (six bytes), between zero and 2112 payload bytes, and a cyclical redundancy check (CRC) word (4 bytes); and an end of frame (EOF) word (4 bytes). The frame header is used to control link applications, control device protocol transfers, and detect missing or out of order frames. The CRC word indicates whether there is a problem in the transmission, such as a data corruption, or whether some part of the frame was dropped during transmission.

Frames received from the Fibre Channel data link 24 are processed by an NL port 36 which decodes and parallelizes the incoming serial data into words. The NL port 36 assembles the words into frames. The NL port 36 also checks the CRC word for each frame received and adds a resulting "good-bad" CRC status indicator to other status information bits within an EOF status word that is generated from the EOF word. The NL port 36 then writes the frames into a receive frame FIFO buffer 28. Further details of a preferred FIFO buffer module 28 are described in co-pending patent application entitled "RECEIVE FRAME FIFO WITH END OF FRAME BYPASS", Ser. No. 08/935, 898 filed on Sep. 23, 1997, and assigned to the same assignee of the present invention, the disclosure of which is incorporated by reference.

Fibre Channel frames are then received by the full-duplex communication processor 22, also referred to as a protocol engine. Several functions are performed by the full duplex communication processor 22, including:1) queuing up a host command to write the data in a received frame into host memory through direct memory access (DMA); 2) validating the frame header to ensure that the frame is the next logical frame that should be received; 3) determining whether the frame is defective or not; and 4) generating transmit frames in response to a received frame or host-generated transmit command.

Unlike conventional protocol engines, the full-duplex communication processor 22 does not include a microprocessor. Instead, dual microcoded engines are employed in order to separate the protocol engine receive tasks from the protocol engine transmit tasks. In particular, the full-duplex communication processor 22 includes a receive protocol engine 30 and a transmit protocol engine 32. These protocol engines communicate to each other through a transfer ready queue 60. The receive protocol engine 30 validates the receive frame headers received from the receive frame buffer 28. The transmit protocol engine 32 builds transmit frames and sends them to the Fibre Channel data link 24 through a transmit FIFO 66 and the NL port 36.

The full duplex communication processor 22 works in conjunction with a host computer 40 that includes host driver software 38 and host memory 42. In particular, the transmit and receive protocol engines 30, 32 communicate directly to the host driver software 38. Fullduplex communication is achieved because the receive and transmit protocol engines operate independently and concurrently. An interlocked context information table is used to permit the receive and transmit protocol engines to operate on the same I/O command, as described in more detail below.

The full-duplex communication processor 22 is able to process frames without involving the host CPU on a frame-by-frame basis. For example, one function of the full-duplex communication processor 22 is to allow a remote device to send a frame along the Fibre Channel link 24 to the receive protocol engine 30 which will "wake up" the transmit protocol engine 32 to send data to the remote device through the NL port 36 to the Fibre Channel link 24. Such data may reside, for example, in the host memory 42.

Figure 5A:
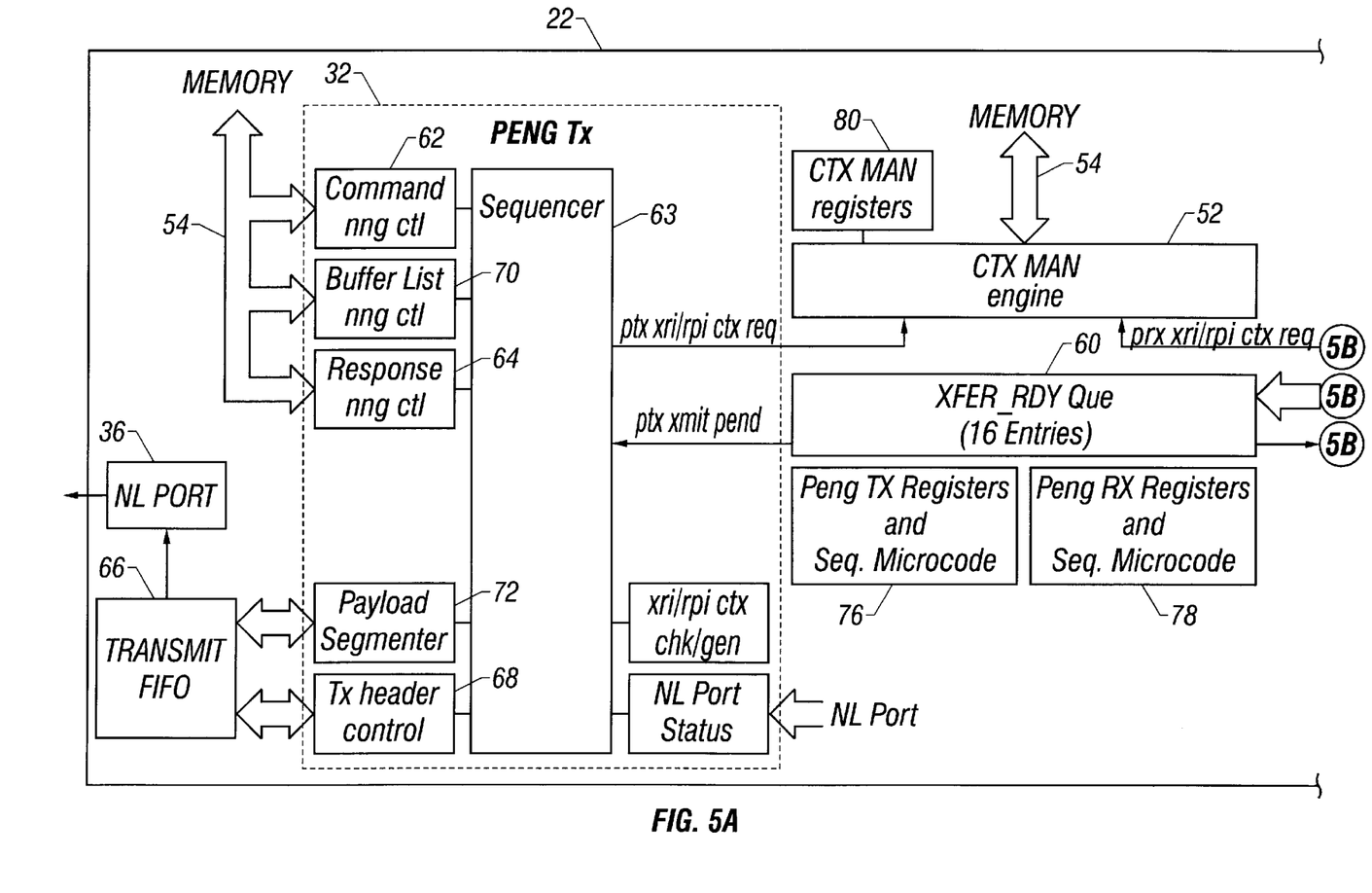
FIG. 5 is a simplified block diagram of a full-duplex communication processor in accordance with a preferred embodiment of the invention.
Figure 5B:
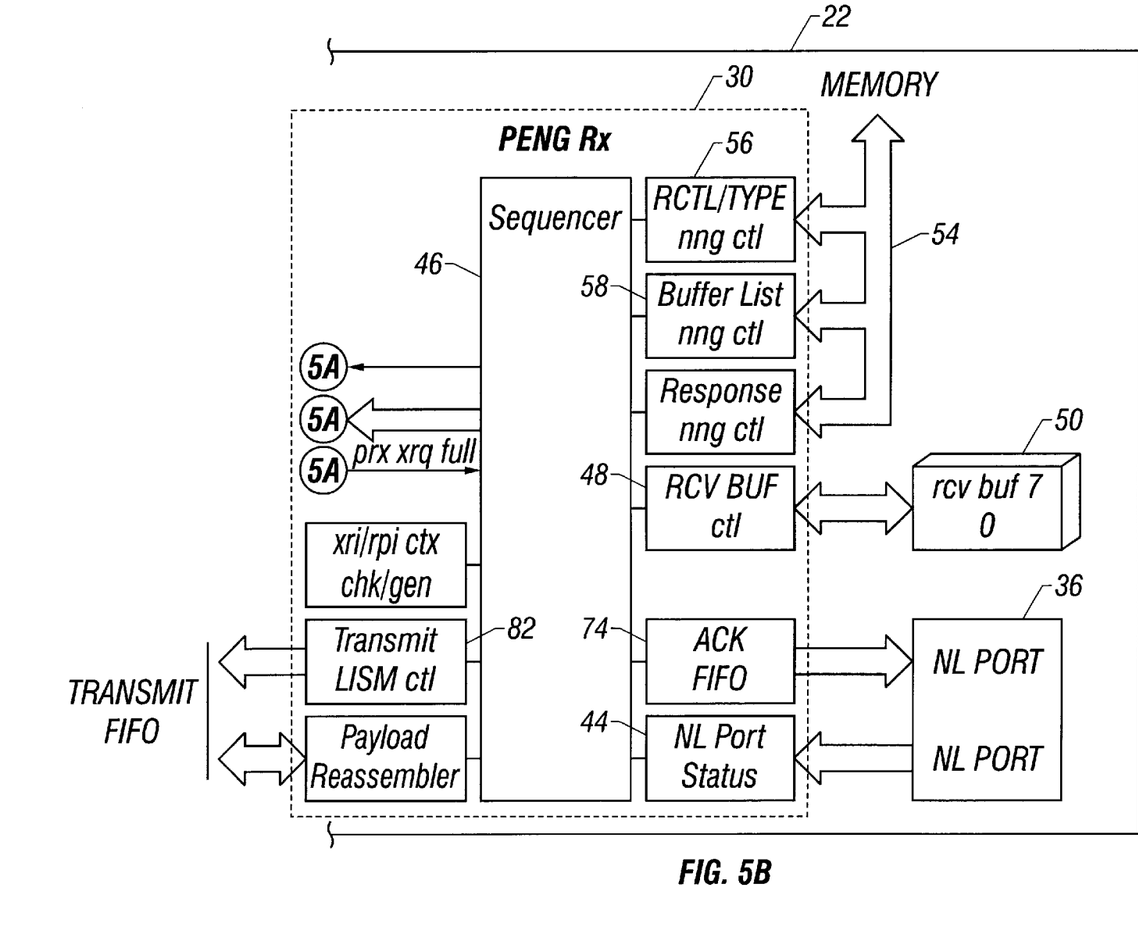

FIG. 5 shows additional details of the full-duplex communication processor 22 of a preferred embodiment of the invention. The full-duplex communication processor 22 includes data structures resident in host memory 42, which may include contiguous and non-contiguous physical memory.

A Fibre Channel frame is received by the receive protocol engine 30 through the NL port 36. An NL port status unit 44 performs the function of timing receive frame sequence and monitoring NL port interrupts. The received frame is sent through a sequencer 46 to a receive buffer control unit 48 which places the received frame in a receive buffer 50. The frame header in the receive buffer 50 is then automatically placed into the receive protocol engine 30.

A lookup field inside each frame header includes a pointer to an associated context. In general, the associated context is initialized by the host driver 38 within the host memory 42, and contains information indicating where to put a particular frame of data in host memory 42. More particularly, the context contains fields such as maximum frame size, current buffer pointer and length, and small computer systems interface (SCSI) state information, defined in a list of buffers.

The host memory unit 42 typically will comprise many megabytes of memory, and each particular frame will fit into one slot in that memory. Each frame header tells the receive protocol engine 30 which context to access or "pull down" for that particular frame so that the receive protocol engine can validate that frame . The context is pulled down from the host memory 42 under control of the context manager engine 52 through a host memory interface 54. The receive protocol engine sequencer 46 then validates the frame.

Once frame validation is complete, the context pointed to by a frame header will tell the receive protocol engine 30 what to do with the frame. There are a number of possibilities, including: 1) send the frame out the Routing Control/Type (R_CTL/TYPE) ring control unit 56 where it then is sent to host memory 42 through the host memory interface 54; 2) send the frame through the Buffer List ring control unit 58 to one segment in the buffer pointer list inside host memory; and 3) process a non-data receive frame and associated payload. (For example, the frame may be a communication frame such as a "transfer ready" that tells the transmitter that the target is now ready to accept data. This would cause the receive frame to pass to the transfer ready queue 60. The transmit command would then be sent to the transmit protocol engine 32).

The second case involves sending a frame to a buffer pointer list, which is a sequential list of buffer descriptors. The first entry in the list contains the total transfer size in bytes. In the illustrated embodiment, only word transfers are performed by the full-duplex communication processor 22. Hence, if the total transfer size is not an integral number of 4-byte words, additional bytes are transferred to the next boundary. Subsequent entries in the buffer list consist of two parts each, one part being an address that points to the start of a buffer and the other part being the size and usage of the buffer.

In accordance with the invention, each buffer pointer list includes buffer list modifier (BLM) bits that describe the buffer usage and which are used to build an outgoing Fibre Channel frame header (the FC-2 header) for each transmit frame. The full-duplex communication processor 22 must build the frame header and corresponding frame control (F_CTL) bits, and transfer the frame header to a transmit FIFO 66 before transferring the payload via a DMA operation. The BLM bits and the buffer lengths in the buffer lists assist the full-duplex communication processor 22 in determining whether a frame is the last one in a series of frames. For the receive protocol engine, the BLM bits control proper placement of received data and status information into the buffer segments. The BLM bits are described in more detail below.

One example of a task performed by the full-duplex communication processor 22 is the processing of a command to write data to a disk drive on the Fibre Channel link 24 from a remote device. A write command is sent and the full-duplex communication processor transfers the command to the disk drive which sends back a transfer ready message to the receive protocol engine 30 indicating that the disk drive is ready to accept the data. This message goes to the transfer ready queue 60 which instructs the transmit protocol engine 32 to retrieve the data from host memory 42, generate a frame and transmit the data to the disk drive.

The transmit protocol engine 32 is triggered by either of two events: one is the presence of an entry in the transfer ready queue 60, and the other is by action of the command ring controller 62. An Exchange Context Resource Index (XRI, described below, is used to process each command. The command ring is a circular queue of command entries, generally read and write commands. These read and write commands can be used, for example, to communicate commands to a remote device such as a disk drive. The size and base memory address of the command ring is specified in a command ring base register which contains "put" and "get" pointers that are used for managing the command ring as follows: the host driver 38 manages the put pointer, incrementing the pointer whenever a command is queued to the command ring 62. The full-duplex communication processor 22 manages the get pointer, incrementing the pointer whenever a command is read from the ring.

A command other than a full-frame transmission provides a pointer to a buffer pointer list. The buffer pointer list contains the total transfer size in the first buffer list entry and buffer pointer-size pairs in subsequent buffer list entries. The XRI field in the command will then be used to instruct the context manager 52 to pull down the appropriate context to the transmit protocol engine 32. This transfer, called an exchange, tells the transmit protocol engine 32 where the engine is in that particular buffer ring list, how much data the frame has and what stage it is in, etc. The context also contains the next frame header. The next frame header is initially built by the host driver 38 but thereafter the transmit protocol engine 32 builds subsequent frame headers. The context manager 52 retrieves each frame header from the host memory 42 and passes the header to the transmit header controller 68, which sends the frame header to the NL port 36 through the transmit FIFO 66.

Once a frame header is built, the system begins following the buffer list in a process that gathers data from host memory. The context for a command contains a pointer to the buffer list. One entry at a time is pulled down from the buffer list by the buffer list ring controller 70. The frame header is transferred to the transmit FIFO 66 through a transmit header control 68. A payload segmenter 72 begins to pull in payload (frame data) and put the payload data into the transmit FIFO 66. Once a frame header and the payload data are in the transmit FIFO 66, the last task is to write an end of frame (EOF) word to the transmit FIFO 66. The EOF word is an indication to the NL port 36 to begin transmitting the assembled frame onto the Fiber Channel link 24. Once all frames are sent out successfully, a response is generated which is sent to the host driver 38, indicating that the frames associated with the pending command were, in fact, sent out successfully.

Likewise, the receive protocol engine 30 contains an acknowledge FIFO 74 which generates an acknowledge frame (basically a modified form of the receive frame header) that is sent back over the Fibre Channel link 24 to the sender to acknowledge receipt.

The full-duplex communication processor 22 also includes receive and transmit protocol engine registers 76 and 78. These registers contain autonomous protocol management functions that are linked and synchronized through the context registers in the context manager 52. The context manager 52 manages coherency and caching of exchange context from the host memory 42, and also synchronizes accesses by the receive and transmit protocol engine 30, 32 to the cached exchange context contained in the context registers 80.

In the preferred embodiment, the context manager 52 and the receive and transmit protocol engines 30, 32 communicate with the host 40 through host memory interface 54 which includes a peripheral components interface (PCI), direct memory access (DMA) controller (not shown), and a PCI slave interface (not shown). The protocol engine registers 76, 78 contain the PCI slave interface and interrupt controller for the protocol engines 30, 32. The context manager 52, receive and transmit protocol engines 30, 32 provide status to and from the protocol engine register 76, 78 for the PCI slave interface and interrupt controller.

The receive and transmit protocol engines 30, 32 implement the Fibre Channel protocol by using two independent programmable sequencers 46 and 63. The use of sequencers 46, 63 allows the protocol engine state machine to be implemented in a variable writable control store RAM, which is downloaded into the receive and transmit protocol engine registers 76, 78 during initialization. The host 40 can access this writable control store RAM and can read and write the writable control store RAM through a protocol register map. The use of the sequencers adds great flexibility to the protocol engine state machine implementation since, by changing code in the writable control store RAM, new or different functionality can be downloaded to the full-duplex communication processor 22.

The full-duplex communication processor 22 can be implemented on a single chip (such as an application specific integrated circuit (ASIC)), alone or together with other functions. For example, in the illustrated embodiment, the full-duplex communication processor 22 can cache one instance of the most recent transmit and receive context. However, by adding additional on-chip memory, additional instances of context can be cached.

Buffer Pointer List

Figure 6A:
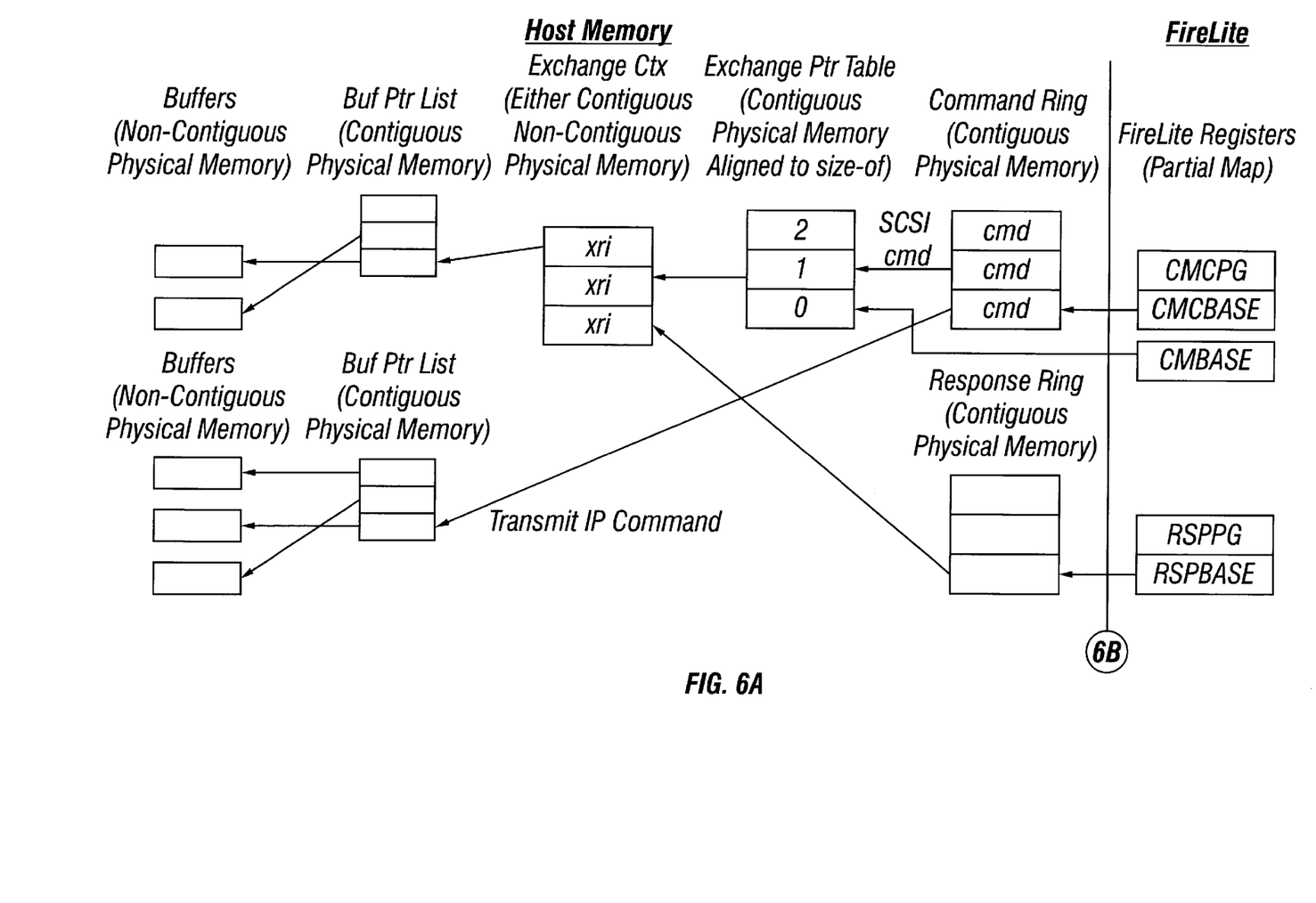
FIG. 6 is a diagram of the host data structures in a preferred embodiment of the invention.
Figure 6B:
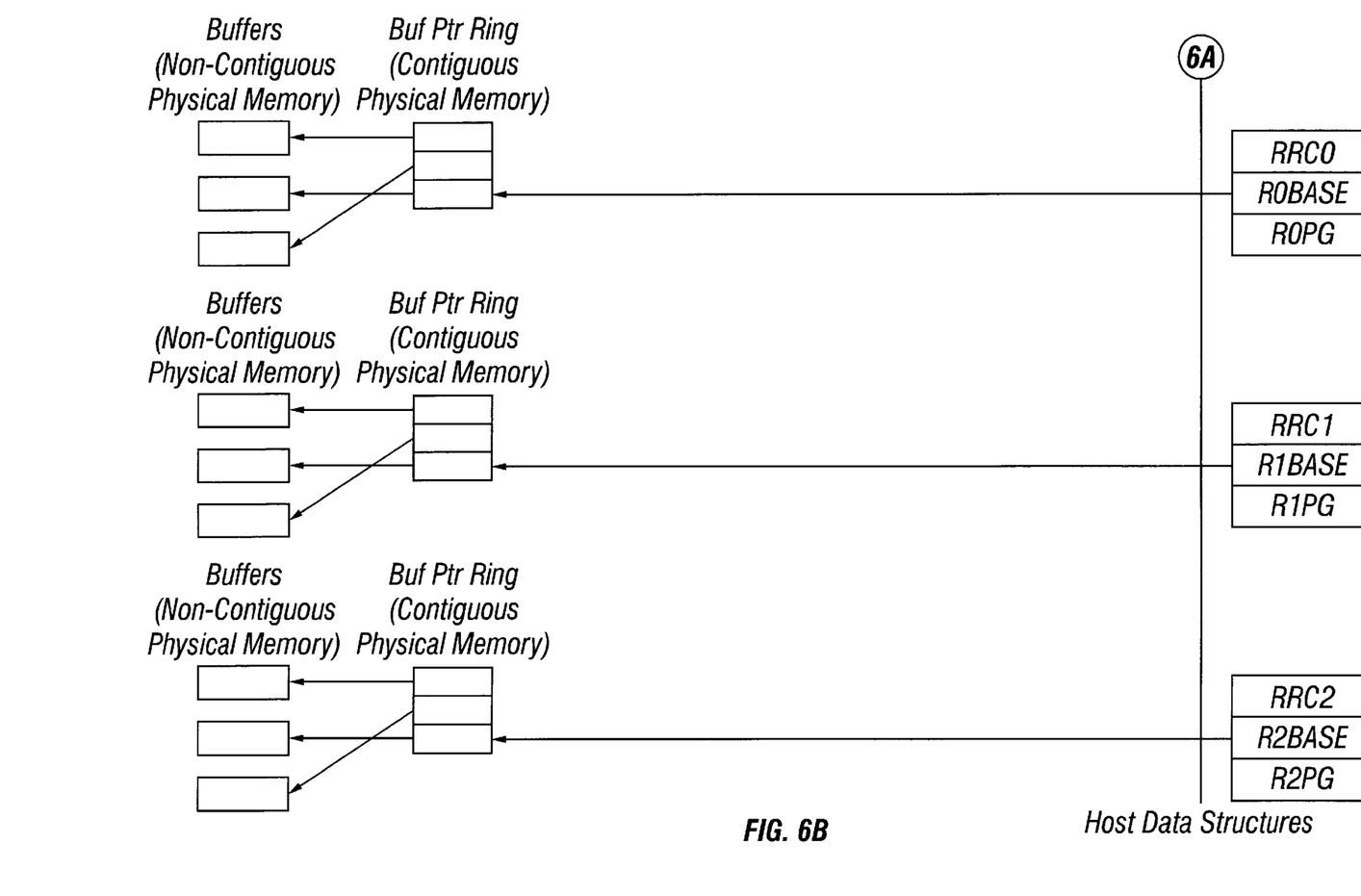

FIG. 6 shows the major data structures in the illustrated embodiment of the full duplex communication processor 22. The Buffer Pointer List shown in FIG. 6 is a sequential list of buffer descriptors. The first entry in the list contains the total transfer size in bytes; however, since the full duplex communication processor 22 performs only word transfers, if the total transfer size is not an integral number of 4-byte words, additional bytes are transferred to the next word boundary. Subsequent entries in the buffer list consist of two parts each, one being an address that points to the start of a buffer and the other being the size in words of the buffer and control bits. However, a starting word address and a buffer word count parameter are used so the host must align the buffer starting address to a 32-bit word address.

Figure 8:
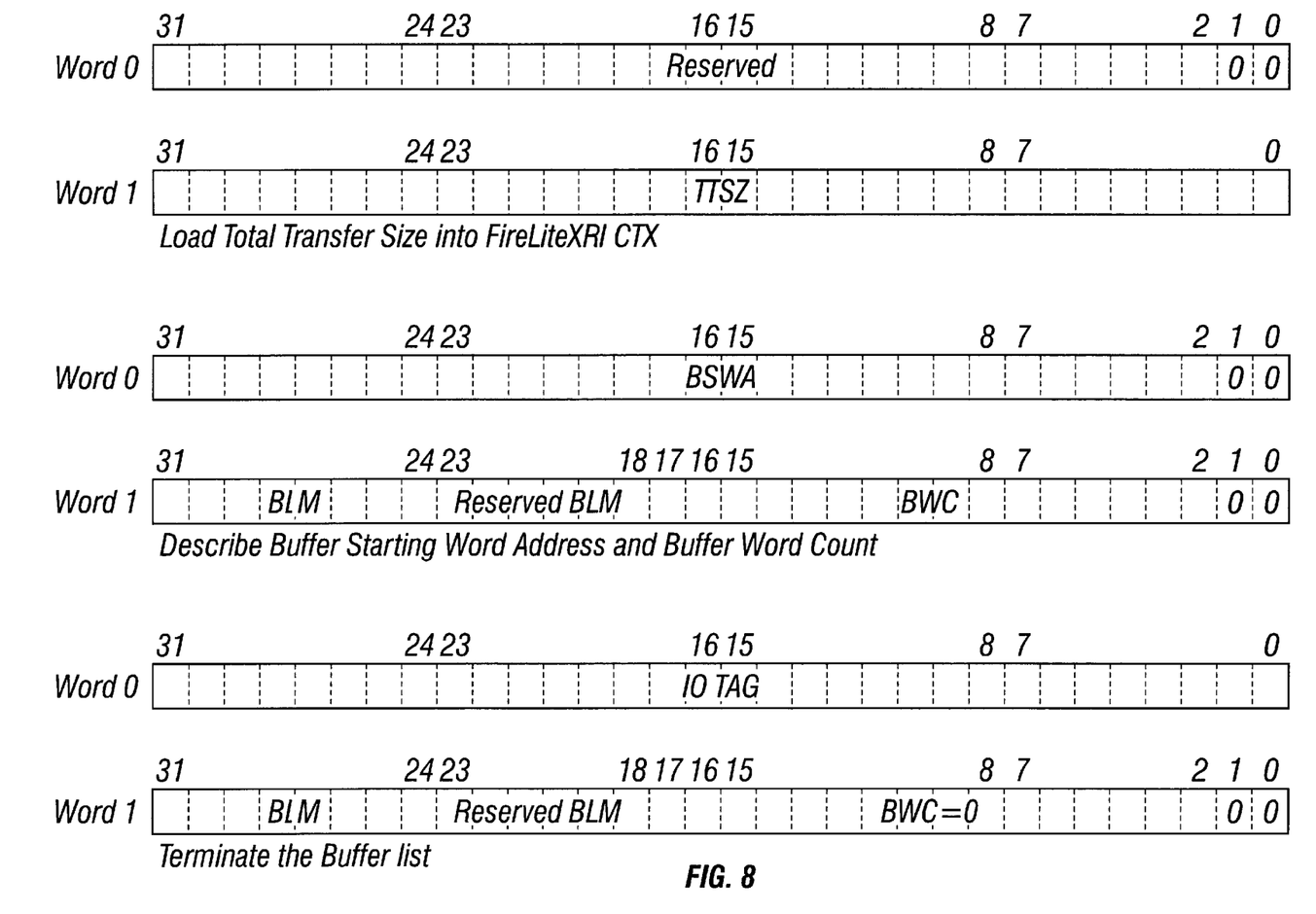
FIG. 8 is a diagram of a Buffer Pointer List Entry format in a preferred embodiment of the invention.

In the illustrated embodiment, a Buffer Pointer List always starts on a quadword (16-byte) boundary. The last entry is always a NULL descriptor. A Buffer Pointer List must exist in contiguous physical memory. The format of the buffer descriptors and the layout of the list are illustrated in FIG. 8, Buffer Pointer List Entry Format, and FIG. 9, Buffer Pointer List Format.

Figure 9:
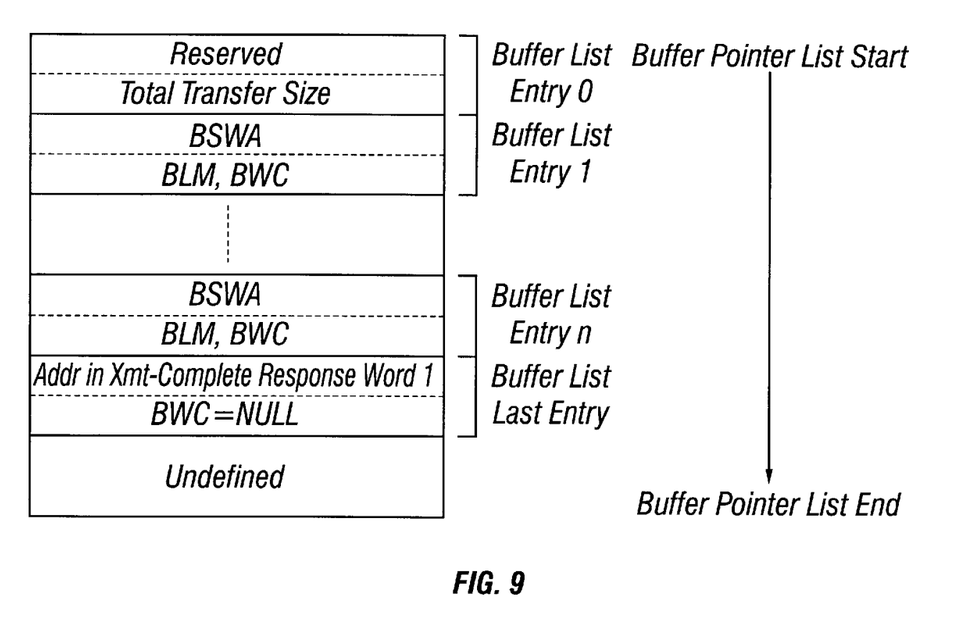
FIG. 9 is a diagram of a Buffer Point List format in a preferred embodiment of the invention.

The bit Buffer Pointer List Entry format and Buffer Pointer List format of the illustrated embodiment are described in detail for one possible embodiment as follows:

Bits [31:0] Total Transfer Size (TTSZ)

The Total Transfer Size is the total number of bytes to be transmitted or received. In the case of FCP I/O's the total transfer size does not include the FCP_CMD, FCP_XFR_RDY or FCP_RSP frames.

Bits [31:2] Buffer Starting Word Address (BSWA)

This field contains the following information depending on the buffer list entry (BLE) position in the buffer list. For the first BLE the BSWA field is not used. For all subsequent BLEs except the last, the BSWA field contains the starting word address of a buffer. For the last BLE, the BSWA field contains the IOTAG. The last BLE is indicated by setting a zero in the BWC (length) field. All BSWA values from 0000,0000h to FFFF,FFFCh are valid.

Bits [31:24] Buffer List Modifiers (BLM)

The BLM bits cause the transmit protocol engine 32 to set or clear certain bits in the FC2 Header. These bits are valid for every BLE except the first BLE, where these bits are redefined as the upper total transfer size bits 31–24. The BLM bits are used as follows:

Bit [31] Receive Buffer

This is a receive buffer and will not be sent.

Bit [30] First Frame Indication

When set, the transmit protocol engine 32 will set the SOF delimiter to SOFi3 for one frame.

Bit [29] F_CTL.fs bit

When set, the transmit protocol engine 32 will set the first-frame-of-exchange F_CTL bit.

Bit [28] F_CTL.si bit

When set, the transmit protocol engine 32 will set the sequence-initiative bit in the F_CTL field for the last frame transmitted for this sequence.

Bit [27] F_CTL.es bit

When set, the transmit protocol engine 32 will set the end-of-sequence bit in the F_CTL field for the last frame transmitted for this sequence.

Bit [26] F_CTL.ls bit

When set, the transmit protocol engine 32 will set the last-sequence bit in the F_CTL field for the last frame transmitted for this sequence to terminate the exchange.

Bit [25] SEQ_COMPLETE

When set, the transmit protocol engine 32 will complete the sequence when all the data pointed to by this BLE is sent.

Bit [24] FCP_DATA

When set, the transmit protocol engine 32 will replace the header TYPE field with FCP_DATA.

Bits [23:18] Reserved BLM

The Reserved BLM bits are mapped to the sequencer for future use, except for the first BLE, where these bits are defined as bits 23–18 of the total transfer size.

Bit [17:2] Buffer Word Count (BWC)

These bits define the length in 32-bit words of the buffer or the Total Transfer size, depending on the BLE position in the buffer list. For the first BLE, these bits provide bits 17–2 of the Total Transfer size. For all subsequent BLEs except the last, this field defines the buffer word count. For the last BLE the BWC field is reserved and must have a zero value.

Bit [1:0] Reserved Bits

Must be written as zero, except for the first BLE, where bits 1–0 define the residual byte length of the total transfer.

Bits [31:0] I/O Tag (IOTAG)

Instead of a BSWA, the last BLE can contain a value that is of use to the Host Driver to identify the operation on completion. This field is not processed by the full-duplex communication processor 22. For normal completion of a Transmit Sequence command, word 1 of the response points to this word.

XRI Context

In the preferred embodiment, each context is divided into two host memory structures: remote port context and exchange context. An exchange context is contained in an Exchange Context Resource Index (XRI) which is used to process a command. In particular, an exchange context is a structure that describes a complete exchange or controls transmission of one or more sequences. The structure is pointed to by an entry in an exchange pointer table. An XRI context contains the supporting context needed for an operation to take place immediately or through separate sequences. The data to send, or the buffers to receive data, are described by a buffer pointer list consisting of a set of buffer list entries that point to the actual buffers. As described above, a buffer list entry contains the address and length of a buffer and control bits to indicate sequence initiative, end of exchange, end of sequence, etc. For multiple-sequence operations the XRI context provides storage for working-register contents.

In the preferred embodiment, the XRI contexts are used by the full-duplex communication processor 22 for: Fibre Channel Protocol (FCP) exchanges that it originates; for transmission exchanges; for Receive Frame validation; and for temporary purposes to control transmission of a single frame or multiple frame sequences. The XRI context may be used by the host driver 38 for keeping track of exchanges for which data is received into buffer ring buffers.

Figure 7:
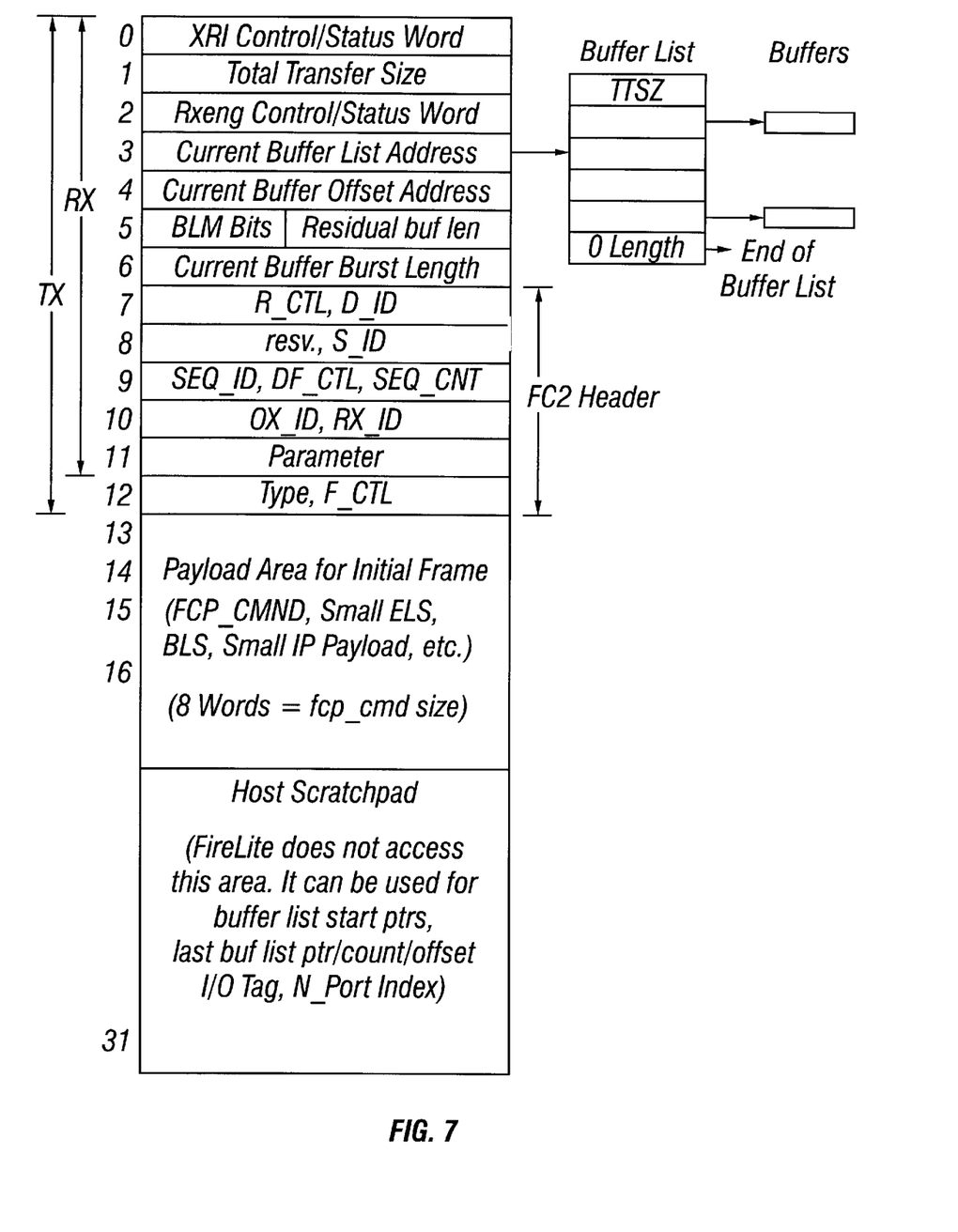
FIG. 7 is a diagram of an Exchange Context Resource Index (XRI) in accordance with a preferred embodiment of the invention.

An example of an XRI context is shown in FIG. 7. The first word is the XRI control-status word. The XRI control-status word contains configuration fields that are set by the host driver. The Total Transfer Size word reflects sequencer activity. For Fibre Channel protocol (FCP) originated exchanges, the XRI control-status word shows the remaining byte count for write operations and the cumulative received byte count for read operations. For transmit sequence commands, the XRI control-status word shows the remaining byte count if the operation is halted before the complete sequence is transmitted. The Rxeng control-status word is used by the receive protocol engine 30 to validate frames. The Current Buffer List Address word reflects sequencer activity, as does the Current Buffer Offset Address word.

The buffer list modifier (BLM) bits are set from the corresponding bits of a buffer list entry (BLE) read under sequencer control. The Residual Buffer Length in word five reflects sequencer activity. Whenever a sequencer reads a BLE, this field receives the buffer word count. Whenever a sequencer issues a DMA operation to transfer data to or from the buffer, the word count is reduced by the length of the transfer data. The Current Buffer Burst Length word also reflects transmit sequencer activity.

The Fibre Channel FC-2 header, in words 7–12, is used to generate header information for each frame transmitted by the transmit protocol engine 22.

R_CTL/TYPE Buffer Rings

Referring again to FIG. 5, the R_CTL/TYPE ring control 56 controls buffer rings that are used to receive all frames except FCP responder frames, ie., for a locally originated FCP exchange. Three R_CTL/TYPE buffer rings assist the host in demultiplexing incoming frames for the appropriate driver entry points. An R_CTL/TYPE buffer ring is a fixed-size sequential list of buffer descriptors. The list is managed by hardware as a logical ring. Buffer descriptors are like buffer list entries in a buffer pointer list, but do not contain BLM bits.

The host driver 42 specifies the location and size of each buffer ring in the corresponding base register. Specific registers specify which entries in the R_CTL/TYPE buffer rings are valid. Each register consists of a put pointer and a get pointer. The receive buffers for each ring are used in the exact order in which the host driver put the corresponding buffer descriptions into the ring.

Loop initialization is initiated locally under host control or remotely by some other port. The host driver 38, the transmit and receive sequencers 46, 63, and the NL port 36 logic, all work together to complete the loop initialization procedure. During this procedure, the host driver either originates or passes on Fibre Channel Extended Link Services (ELS) frames that determine the addresses and capabilities of the ports on the loop. The host driver 38 is responsible for issuing Loop Initialization Select Master (LISM) ELS frames which facilitate the loop initialization process.

Initialization is needed because both the receive and transmit protocol engines 30, 32 are basically two autonomous engines running in full-duplex and they have very minimal communication between the two of them. During initialization, the transmit protocol engine 32 is turned off and the receive protocol engine 30 is allowed to receive frames and then send them through the transmit protocol engine 32. Thus, the receive protocol engine takes up "ownership" of the transmit protocol engine hardware and uses that hardware to forward frames, in particular, the LISM frames which are transmitted utilizing the transmit LISM control module 82.

Buffer List Modifier Bit Interpreter

The full duplex communication processor 22 uses the buffer list modifier (BLM) bits to build the outgoing Fibre Channel FC2 header. It must build the header and the corresponding F_CTL bits, and transfer it into the transmit FIFO before DMAing the payload. The BLM bits and the buffer lengths in the buffer list assist the processor 22 in determining whether the frame is the last one. These parameters are interpreted by the full-duplex communication processor 22 as shown by the following pseudo-code:

```
if (first frame of command or xfr_rdy)
    if (BLM.first_frame)
        SOF=SOFi3
    else SOF=SOFn3//Set SOFi3/n3 delimiter
else SOF=SOFn3
if (BLM.first_sequence) F_CTL.fs=1
else F_CTL.fs=0//Set F_CTL first frame bit
if (BLM.FCP_DATA) R_CTL=FCP_DATA,
    F_CTL.rop=1
//Set up FCP_DATA frame
if (sequence_complete)
    if (BLM.si) F_CTL.si=1
    if (BLM.es) F_CTL.es=1
    if (BLM.ls) F_CTL.ls=1
    F_CTL.fill_bytes=fill bytes from burst length running
        count
    SOF.Last_Frame=1
where:
    sequence_complete=(total transfer size<=max frame
        size)||
    (Burst size<=max frame size)||
    (BLM.SEQ_COMP && (remaining buffer size
        (<=max frame size))
    max frame size=min(N_Port max frame size, 1k)
    if FCP burst size=FCP_XFR_RDY burst length field
    else burst size=total transfer size
```

The BLM bits are updated in the XRI Context as each BLE is processed by the full-duplex communication processor 22. In certain exception conditions, the driver must update the BLM bits in the XRI Context before issuing a Restart command to resume sequence transmission. As an example, the BLM first_frame bit must be clear to resume transmitting a sequence after the first frame has already been transmitted.

By helping the processor 22 determine whether a frame is the last one, the BLM bits allows the transmit protocol engine 32 to build the transmit frame header in one pass, without advance notice of the frame payload data size. Also, the BLM bits permit the transmit protocol engine 32 to load the transmit header words into the transmit buffer prior to any knowledge of the transmit payload size. This simplifies the transmit buffer FIFO 66 architecture without requiring repositioning of the address logic on the address pointer.

Additional details of a preferred embodiment of the Full-Duplex Communication Processor 22 of the invention are contained in the co-pending patent application entitled "Full Duplex Communication Processor", Ser. No. 08/937,066 filed on Sep. 24, 1997, and assigned to the same assignee as the present invention, the disclosure of which is incorporated by reference. It will be appreciated by those skilled in the art that the BLM bits can be used with similar advantages in other communication processors, such as those which utilize a single protocol engine for transmit and receive processes.

A number of embodiments of the present invention have been described. Nevertheless, it will be understood that various modifications may be made without departing from the spirit and scope of the invention. Accordingly, it is to be understood that the invention is not to be limited by the specific illustrated embodiments, but only by the scope of the claims.

What is claimed is:

1. A communication processor adapted to be coupled to a computer network and to a host computer, the host computer including host memory, CPU, payload data and host driver software, the communication processor comprising:

a receive processor and a transmit processor coupled to the computer network for receiving and validating received frames of data, and for constructing and transmitting frames of data, wherein the frames of data include headers, said receive and transmit processor being operably coupled to receive and validate said frames of data without frame-by-frame involvement of the CPU and without a resident microprocessor; and an interface for coupling said receive and transmit processors with said host computer, wherein said host driver software is configured to set predetermined bits in a frame which indicate the last frame in a series of frames, and said receive and transmit processors being configured to use said predetermined bits to build a transmit frame header containing information regarding the last frame in a series of frames.

2. A communication processor according to claim 1, further comprising an interlocked information table containing context information wherein the receive processor uses said context information to process said received frames of data and the transmit processor uses said predetermined bits to build a transmit header from said context information so as to build transmit frames and without involving said CPU.

3. A communication processor according to claim 1, wherein said transmit and receive processors comprise independent associated transmit and receive microcoded engines.

4. A communication processor according to claim 1, wherein each said microcoded engine is a sequencer.

5. A communication processor according to claim 1, wherein said received frames of data are Fibre Channel frames.

6. A communication processor according to claim 5, wherein said receive and transmit processors each implement an FC-2 Fibre Channel communications protocol.

7. A communication processor according to claim 1, comprising: a single integrated circuit containing said receive and transmit processors.

8. communication processor according to claim 1, wherein said interface includes a direct memory access (DMA) interface.

9. In a communication processor including a receive processor and a transmit processor operably coupled to receive and validate frames of data without frame-by-frame involvement of an external CPU and without a resident microprocessor, a method of processing a series of frames comprising:

receiving a first frame of data by the receive processor from a computer network;

transferring said first frame of data from said receive processor to a communication module;

storing contextual information relating to said first frame in an information table;

using said contextual information to validate said first frame;

setting predetermined bits in a frame which indicate the last frame in said series of frames;

constructing, by the transmit processor, a transmit frame containing information indicating the last frame in said series of frames; and transferring said transmit frame to said computer network.

10. A method according to claim 9, wherein said first frame is a Fibre Channel frame and said step of constructing a transmit frame includes constructing a Fibre Channel transmit frame.

11. A method according to claim 10, further comprising the step of coupling said receive and transmit processors to said host computer through a direct memory access (DMA) interface.

12. A computer network comprising:

(a) source and destination computer devices;

(b) a communication channel coupled to said source and destination computer devices;

(c) a receive processor and a transmit processor coupled to said communication channel, wherein said receive processor receives and validates a series of frames of data from said source computer device where the series of frames of data include commands, and wherein said transmit processor constructs transmit frames;

(d) a host computer including a CPU, memory and driver software;

(e) an interface for coupling said receive and transmit processors with said host computer;

(f) said driver software in said host computer arranged and configured to set predetermined bits in a frame which indicates which frame is the last frame in said series;

(g) said receive and transmit processors being configured to use said predetermined bits to build a transmit frame header containing information identifying the last frame in a series of frames, and (h) the receive and transmit processors being operably coupled to receive and validate frames of data without frame-by-frame involvement of an external CPU and without a resident microprocessor.

13. A computer network according to claim 12, wherein said frames of data are Fibre Channel frames.

14. A computer network according to claim 12, wherein said receive and transmit processors each implement an FC-2 Fibre Channel communications protocol.

15. A computer network according to claim 12, wherein said interface includes a direct memory access (DMA) interface.

* * * * *